Patented Sept. 21, 1926.

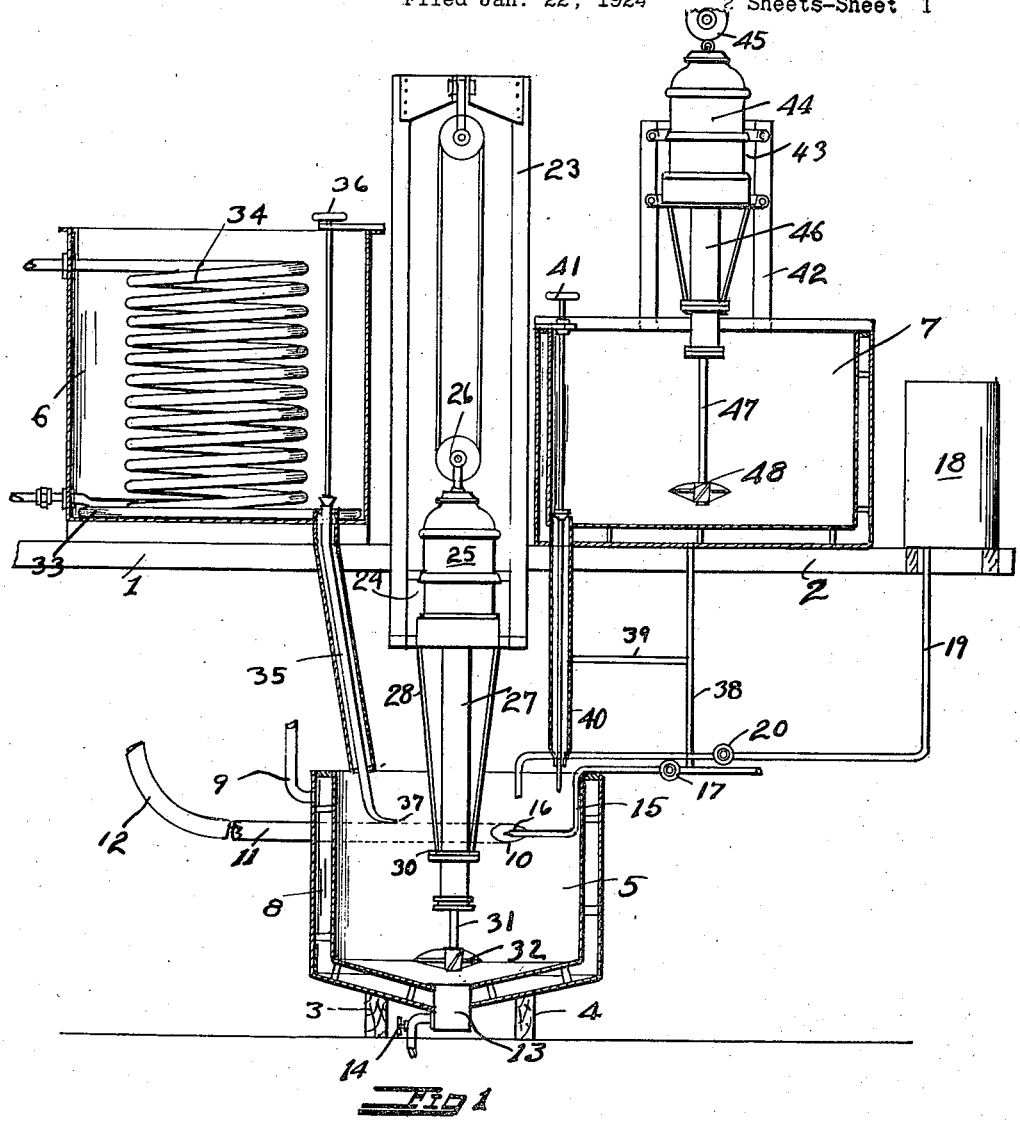

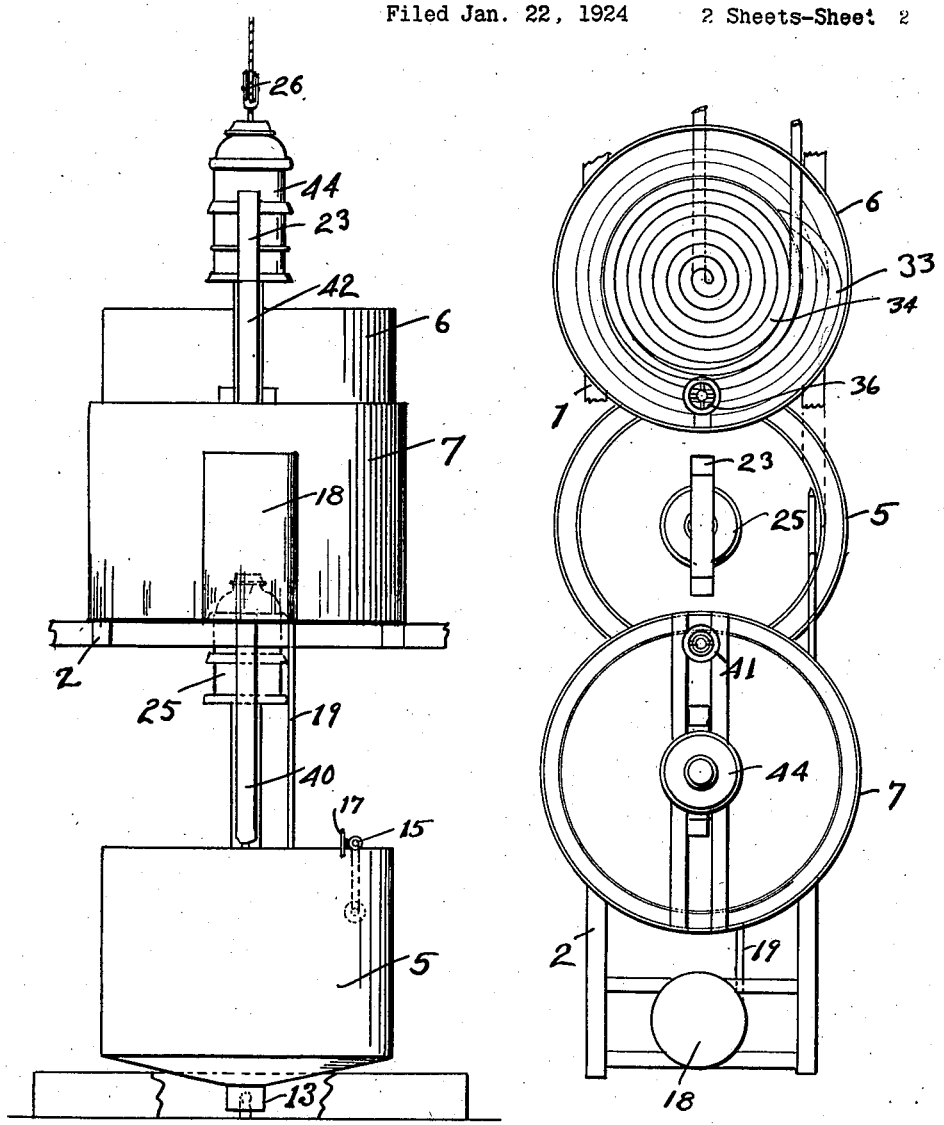

1,600,948

UNITED STATES PATENT OFFICE.

GEORGE B. POORE, OF SAN FRANCISCO, CALIFORNIA.

APPARATUS FOR PRODUCING BITUMINOUS COMPOSITIONS WITH WATER.

Application filed January 22, 1924. Serial No. 687,847.

This invention relates to an apparatus for producing bituminous compositions of matter reducible in water, which can be kept in a moist condition and be again thinned out, but which when dried out thoroughly will return to the normal condition of the bitumen impervious to water.

Bitumen is the name used to denote a group of mineral substances composed of different hydro-carbons found widely distributed throughout the world in a variety of forms, which grade from thin volatile liquids to thick semifluids and solids, sometimes in a free or pure state but more frequently intermixed with or saturating different kinds of inorganic or organic matter. Different names are employed to designate the condition under which bitumen is found. The liquid varieties are known as naphtha and petroleum, the semifluid or viscous varieties as maltha or mineral tar and the solid or compact varieties as asphaltum or asphalt.

This composition of matter is used for the purpose of road-making, paint making and in fact any purpose for which bitumens can be used, the water treatment process taking the place of the heating ordinarily employed to bring the material to a convenient consistency for use.

The product consists of asphalt, clay and water, the clay being in such small percentage as to be beneficial in filling the voids when the bitumen is used with sand and rock in road or roofing materials.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a side elevation of the complete apparatus,

Fig. 2 is an end elevation of the complete apparatus,

Fig. 3 is a plan view of the complete apparatus.

It will be understood that the details of the apparatus may be varied at will so long as the principle is carried out which broadly consists in heating the clay and water tank to a temperature of about 130 to 150 degrees Fahrenheit, heating the asphalt until it is liquid (about 250 degrees Fahrenheit) delivering a thin stream of each substance to a mixer and removing a thin stream of the mixed materials from the mixer when the composition of matter has been reduced to the proper consistency, and at a place where the mixing is complete.

The numerals 1 to 4 inclusive indicate suitably supported joists which carry three tanks 5, 6 and 7. The tank 5 is supported on the joists 3 and 4, and has a steam jacket 8 to which a steam supply pipe 9 is connected. In the side of the tank there is an opening 10 to which there is connected a tangential discharge pipe 11 on the end of which is a flexible pipe 12 which may be manually raised or lowered to increase or diminish the rate of discharge of the material from the apparatus. The bottom of the tank 5 is conical and has a discharge pipe 13, with a valve 14 which may be used to clean out the tank whenever necessary.

Since the asphalt may become too thick to flow well at times, a steam pipe 15 is provided with a nozzle 16 about the center of the opening 10 whereby the pipes 11 and 12 may be cleaned out whenever necessary. The pipe 15 has a control valve 17. In order to supply the tank 5 with additional water whenever needed there is a small tank 18 and pipe 19 with a control valve 20, which pipe discharges into the tank 5.

Supported on the joists 1 and 2 is a rectangular frame 23 made of T bars, and in which a slide 24 is vertically movable. The slide is connected to the motor 25 which latter is supported at any desired height by means of a set of chain blocks 26. Secured to the motor frame and depending therefrom is a heavy tube 27 braced by rods 28 extending from the motor base to a collar 30 surrounding the tube. Said tube 27 forms the support for the bearings of the shaft 31 on the lower end of which is the propeller 32.

The tank 6 is provided with a flat steam coil 33 in the bottom of the tank and with an upwardly extending steam coil 34. Extending downwardly from the tank 6 is a steam jacketed discharge pipe 35 controlled by a valve 36 and terminating in a flat nozzle 37 to deliver a thin flat stream of the melted asphalt to the mixing receptacle. The tank 6 may be heavily insulated or made of wood to avoid any unnecessary loss of heat.

The tank 7 has double walls so the material placed therein can be easily heated by supplying steam thereto through the pipe 38 which pipe has a connection 39 supplying the jacket of the discharge pipe 40 with steam. The pipe 40 has a valve 41 to control the discharge therefrom.

Extending across the top of the tank 7 is a sill for the support of the rectangular T bar frame 42 in which the motor slide 43 is movable and to which the motor 44 is connected. The motor is supported by the chain blocks 45 so that it is possible to raise or lower the motor at will. Depending from the motor is a heavy tube 46 which forms the support for the bearings for the shaft 47 on the lower end of which is the screw propeller 48.

Steam is supplied to the apparatus from any suitable boiler with which all the steam pipes may be connected.

Since it is necessary to operate the motors in a very thick composition as well as in a comparatively thin solution it is necessary to make use of a type of motor developing substantially the same horsepower throughout wide variations of speed, but this particular motor does not form a part of this invention and is not further described or illustrated in this application.

In operation, a quantity of asphalt is placed in the tank 6 and heated to about 250 degrees Fahrenheit. At the same time a quantity of clay and water is placed in the tank 7 whereupon the motor 44 is started and the clay is completely broken up and mixed with the water.

Some of the clay mixture or some of the previously prepared asphalt mixture is then placed in tank 5 whereupon its motor is started and the contents of the tank are thoroughly mixed. When the agitation has gone on until a homogeneous mixture is produced streams of material from the tanks 6 and 7 will be allowed to slowly run into the tank 5. The propeller 32 is operated so as to drive the materials downwardly and thereby produce a whirling vortex of fluid in which almost microscopic particles of asphalt are covered with clay. When the whirling vortex rises high enough to reach the opening 10, and when the workman judges from the consistency of the material that he has added all the asphalt he can and still produce a composition of matter which will be reducible in water, he will lower the tube 12, aiding the escape of material from time to time, if necessary, by allowing some steam to escape from the nozzle 16.

When completely mixed the materials may be discharged to any convenient place of storage or may be placed in barrels or cans for sale.

In actual practice a comparatively small percentage of clay is used, and is thoroughly mixed with the water in the clay mixing tank. The two streams of clay and asphalt are then allowed to run together, simultaneously, and the workman adds asphalt as long as it is possible to do so, the object being to produce a composition of matter that will be as heavy in asphalt as is consistent with the mechanical necessities, in producing a composition of matter that will flow out of the apparatus, rapidly enough, to make the expense of treatment a minimum.

Since at times the workman may allow too much asphalt to pass into the mixing receptacle 5, it may be necessary to add water from the tank 18 and it may also happen that the discharge pipe 11 becomes stopped up because the mixture becomes too hard. In that event the pipe is cleaned out by opening the valve 17 and allowing some steam to escape from the nozzle 16.

What I claim is as follows, but modifications may be made in carrying out the invention shown in the drawings and in the above particularly described form thereof, within the purview of the invention, as defined by the annexed claims:

1. An apparatus for the production of bitumen compositions reducible in water, comprising a mixing receptacle, means to heat the same, a discharge pipe on the side of the receptacle, an asphalt heating receptacle, a discharge pipe depending therefrom into the mixing receptacle, a receptacle for mixing clay, means to heat the asphalt and a receptacle for mixing clay, a discharge pipe depending from the clay mixing receptacle into the first mixing receptacle, and means to cause a violent agitation and rotation of materials fed into the first mixing receptacle.

2. An apparatus for the production of asphalt and bitumen compositions reducible in water which consists of a mixing receptacle, means to heat the same, a discharge pipe for said receptacle opening into the side of the same, a revoluble propeller in the mixing receptacle to cause a violent rotation and agitation of the composition, a motor for the operation thereof, means to adjust the elevation of the motor and mixing propeller, a tank for receiving and heating asphalt, a pipe depending therefrom into the mixing receptacle, a clay receiving and mixing receptacle, means to heat the receptacle for mixing asphalt and receptacle for mixing clay, a mixing propeller in the clay receptacle, and a motor connected therewith to drive said propeller.

3. An apparatus for the production of asphalt or bitumen compositions reducible in water which consists of a mixing receptacle, means to heat the same, a discharge pipe opening into the side of said receptacle, a mixing propeller in said receptacle, a motor connected to the propeller shaft, means to raise and lower the motor and propeller, a receptacle for mixing asphalt, means to heat the same, a discharge pipe depending therefrom into the mixing receptacle, a receptacle for receiving and mixing clay, means to heat the same, a pipe depending therefrom into the first mixing receptacle, a revoluble propeller in the clay mixing tank, a motor connected therewith and means to raise and lower the motor and propeller.

4. An apparatus of the class described comprising a mixing receptacle, means to heat the same, a discharge pipe therefor connected therewith on the side of the receptacle, a mixing propeller in said receptacle, a motor connected therewith, a receptacle for mixing asphalt, means to heat the same, a discharge pipe depending therefrom into the mixing receptacle, a receptacle for receiving and mixing clay and water, means to heat the same, a propeller therein, a motor for the operation of said propeller, a discharge pipe depending from the clay mixing receptacle into the first mixing receptacle, and means to supply the first mixing receptacle with measured quantities of water.

5. An apparatus of the class described, comprising a mixing receptacle, means to heat the same, a discharge pipe opening into the mixing receptacle on the side thereof, a steam nozzle adjacent said discharge pipe opening to allow steam to be discharged thereinto when necessary, a receptacle for melting asphalt, a discharge pipe depending therefrom into the mixing receptacle, means to heat said discharge pipe, a receptacle for mixing clay and water, and a discharge pipe depending therefrom into the first mixing receptacle to mix the materials in the clay and water receptacle and in the first mixing receptacle.

6. An apparatus of the class described, comprising a mixing receptacle, a discharge pipe opening thereinto on the side thereof, a steam nozzle adjacent said opening to allow steam to be projected thereinto when necessary, an asphalt melting receptacle, a discharge pipe depending therefrom into the mixing receptacle, a clay and water mixing receptacle, a discharge pipe depending therefrom into the first mixing receptacle, means to heat said discharge pipe, and means to mix the materials in the clay and water receptacle and in the first mixing receptacle.

In testimony whereof I have hereunto set my hand this 17th day of January A. D. 1923.

GEORGE B. POORE.